April 8, 1930.  F. R. ERBACH  1,753,922

COMPRESSOR VALVE

Filed Dec. 16, 1927

INVENTOR.
Frederick R. Erbach

BY Hart & Lind

ATTORNEYS

Patented Apr. 8, 1930

1,753,922

UNITED STATES PATENT OFFICE

FREDERICK R. ERBACH, OF DETROIT, MICHIGAN, ASSIGNOR TO KELVINATOR CORPORATION, OF DETROIT, MICHIGAN, A CORPORATION OF MICHIGAN

COMPRESSOR VALVE

Application filed December 16, 1927. Serial No. 240,409.

My invention relates to compressors of the reciprocating piston type and it relates particularly to a novel type of valve for use in a movable piston therein.

Heretofore it has been customary to employ various types of valves in movable pistons for use in compressors of the reciprocating piston type, but practically all of them are complicated in design, difficult to adjust, and expensive to manufacture.

By my invention I have obviated these objections and provided a valve which is simple in design, simple to adjust and durable and inexpensive in construction.

One object of my invention is to provide a novel type of piston valve for use in compressors of the reciprocating piston type.

Another object of my invention consists in providing a particularly simple and inexpensive valve structure which lends itself readily to simplicity of adjustment.

Figure 1:
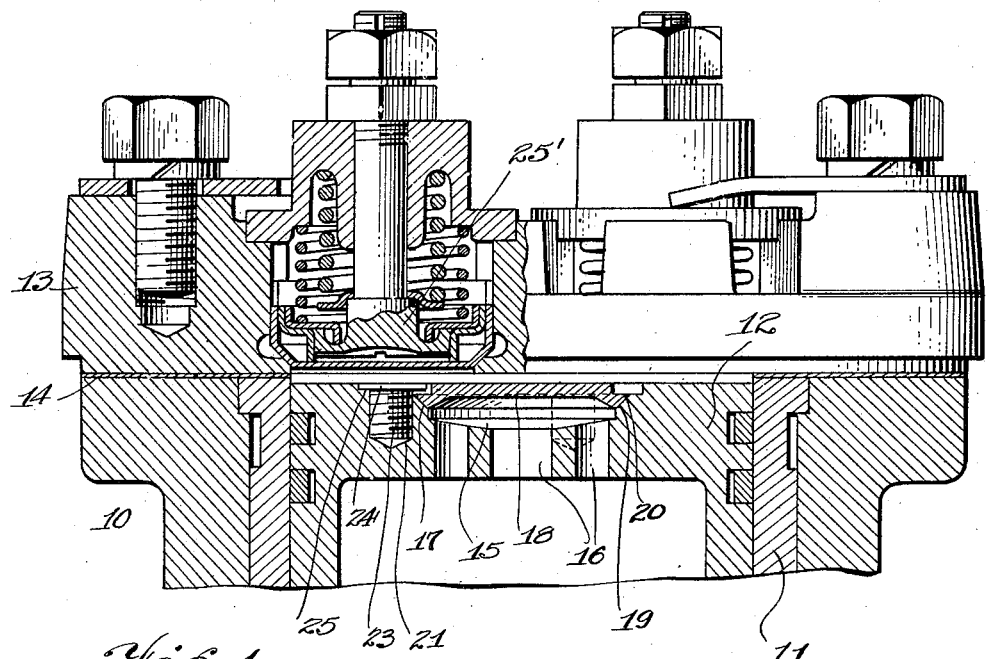
Figure 2:
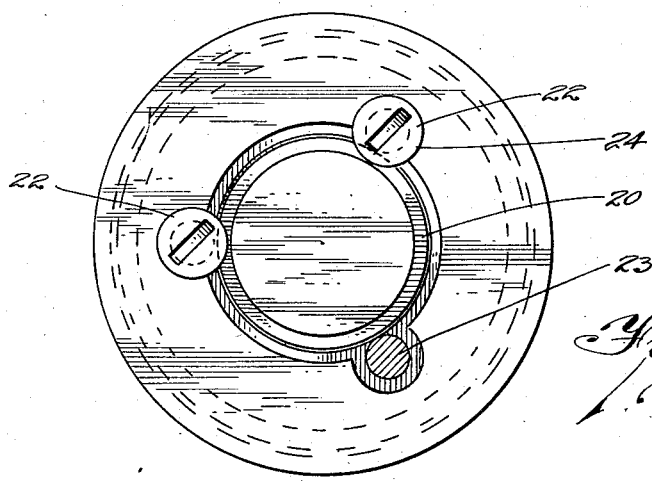

For a better understanding of my invention reference may now be had to the accompanying drawings of which Fig. 1 is a vertical cross-sectional view of a compressor provided with a piston valve constructed in accordance with my invention; and Fig. 2 is a plan view of the piston and the valve illustrated in Fig. 1.

In the drawings I have illustrated a cylinder 10 of a fluid compressor, provided with a cylinder lining 11 within which is disposed a movable piston 12. Secured, in any suitable manner, to the cylinder 10 is a cylinder head 13, a gasket 14 being interposed therebetween to prevent the leakage of compressed fluid therebetween.

The piston 12 is provided with a centrally disposed shallow recess 15, which is in open communication with the interior of the piston 12, through the agency of ducts or passageways 16. The recess 15 is also provided, adjacent its outer edge, with an inclined valve seat 17. A disk 18 is provided with an outer inclined edge 19 which engages the valve seat 17, thus sealing, when in its closed position, the recess from the exterior or high pressure side of the cylinder. The upper surface of the disk is flat, being flush with the top of the piston, and is provided about its outer edge with an annular groove 20.

Disposed about the recess 15 in regularly spaced arrangement are three threaded openings 21, in which are disposed bolts 22, each consisting of a threaded shank 23, which fits into an opening 21, and a head 24. The heads 24 each fit into a circular recess 25 provided therefor in the piston, and at one side project into the annular groove 20 in the disk 18. The shanks 23 are spaced a short distance from the edge of the disk 18 and serve to prevent lateral displacement thereof. The bolt heads 24 are so disposed as to project over the edge of the disk 18, and are spaced therefrom when the disk is in its lower or valve closing position. When, owing to the downward movement of the piston, the pressure below the piston is sufficiently higher than the pressure above the piston, the disk 18 is raised from its seat, permitting gas to flow therethrough into the interior of the cylinder above the piston. When the disk 18 is raised from the seat 17 its outer edges engage the heads 24 of the bolts 22, which serve to limit the travel of the disk.

The gas compressed in the cylinder by the upward movement of the piston passes through pressure operated discharge valves 25, of any suitable type, into a compressed gas container or reservoir (not shown). As the discharge valves form no part of my present invention they are not here described in detail.

As the piston 12 starts on its downward stroke, the disk 18 tends to remain stationary owing to its inertia, which, together with the partial vacuum produced in the cylinder above the piston by the downward movement of the piston opens the valve and causes it to remain open during the major portion of the downward stroke of the piston. In like manner, when the piston starts its upward stroke, the inertia of the disk 18 causes it to engage the valve seat 17 and holds it tightly thereagainst during the entire upward stroke of the piston, thus insuring a good sealing action.

From the foregoing description it will be apparent that the bolts 22 serve to prevent lateral displacement, and to limit the extent of movement, of the disk 18. Also, it will be apparent that the adjustment of the valve consists merely in inserting the bolt shanks 23 into the openings 21 provided therefor until the heads 24 are firmly seated in the recesses 25 provided therefor. The amount of lift of the valve disk is determined by the depth of the annular groove 20, the upper horizontal surface of which is spaced from the under side of the bolt head 24 when the disk is in engagement with the valve seat 17.

Although I have illustrated but a single form of my invention and have described in detail but a single application thereof, it will be apparent to those skilled in the art that it is not so limited but that various changes and modifications may be made therein without departing from the spirit of my invention or from the scope of the appended claims.

What I claim is:

1. In a compressor, a piston provided with a valve port in the face thereof, a relatively movable disk adapted to close said port, and a plurality of screw threaded members secured to said piston in regularly spaced relation about said port and adapted to be engaged by said disk when said disk moves from said port.

2. In a compressor, a piston provided with a valve port in the face thereof, a relatively movable disk adapted to close said port, and a plurality of screw threaded bolts secured to said piston in regularly spaced relation about said port, said bolts being each provided with a shank adapted to prevent lateral displacement of said disk and a head adapted to limit the extent of opening movement thereof.

In testimony whereof I hereunto affix my signature.

FREDERICK R. ERBACH.